(12) United States Patent
Jones et al.

(10) Patent No.: US 7,345,374 B1
(45) Date of Patent: Mar. 18, 2008

(54) DECORATIVE WINDMILL WITH SOLAR PANEL

(75) Inventors: Chad H. Jones, Frisco, TX (US); Scott A. Plasek, Irving, TX (US); Gustav P. Kuelbs, Grapevine, TX (US)

(73) Assignee: World Factory, Inc., Coppell, TX (US)

( * ) Notice: Subject to any disclaimer, the term of this patent is extended or adjusted under 35 U.S.C. 154(b) by 98 days.

(21) Appl. No.: 11/361,279

(22) Filed: Feb. 24, 2006

Related U.S. Application Data (60) Provisional application No. 60/656,577, filed on Feb. 25, 2005.

(51) Int. Cl.
*F03D 9/00* (2006.01)

(52) U.S. Cl. .......................................... 290/44; 290/55

(58) Field of Classification Search ............... 290/1 R, 290/1 A, 43, 44, 54, 55; 415/2
See application file for complete search history.

(56) References Cited

U.S. PATENT DOCUMENTS

| | | | | |
|---|---|---|---|---|
| 4,551,631 A | * | 11/1985 | Trigilio | 290/55 |
| 5,221,186 A | * | 6/1993 | Machin | 416/61 |
| 5,254,876 A | * | 10/1993 | Hickey | 290/55 |
| 5,852,353 A | * | 12/1998 | Kochanneck | 318/558 |
| 6,016,015 A | * | 1/2000 | Willard, Jr. | 290/55 |
| 6,097,104 A | * | 8/2000 | Russell | 290/54 |
| 6,227,803 B1 | * | 5/2001 | Shim | 416/44 |
| 6,372,978 B1 | * | 4/2002 | Cifaldi | 136/248 |
| 6,897,575 B1 | * | 5/2005 | Yu | 290/44 |
| 7,045,702 B2 | * | 5/2006 | Kashyap | 136/244 |
| 7,105,940 B2 | * | 9/2006 | Weesner et al. | 290/44 |
| 2007/0090653 A1 | * | 4/2007 | Martelon | 290/55 |

* cited by examiner

*Primary Examiner*—Nicholas Ponomarenko
(74) *Attorney, Agent, or Firm*—James E. Walton (57) ABSTRACT

A decorative windmill having a solar energy system for powering an electrical subsystem is disclosed. The electrical subsystem may include lighting elements for illuminating the windmill and the area around the windmill in a decorative and functional manner.

18 Claims, 5 Drawing Sheets

DECORATIVE WINDMILL WITH SOLAR PANEL

This application claims the benefit of U.S. Provisional Application No. 60/656,577, filed 25 Feb. 2005, titled "SOLAR POWERED WINDMILL."

BACKGROUND OF THE INVENTION

1. Field of the Invention

The present invention relates in general to the field of decorative windmills.

2. Description of Related Art

There are many designs of decorative windmills well known in the art. However, there remains room for improvement upon current decorative windmill designs. There are many occasions on which a user needs electrical energy to power devices for use in association with decorative windmills. For example, some decorative windmills are used outdoors at night when the user of the windmill may not be able to visually inspect the windmill, thereby not fully enjoying the decorative elements of the windmill. Also, safety risks are involved with the use of current windmill designs. For example, a poorly illuminated windmill could easily be the cause of a user to stumble or otherwise incur physical injury due to lack of illumination.

Further, current decorative windmill designs offer a variety of leg and cross brace configurations. Common designs are three or four legged windmill with braces attached between adjacent legs. One problem with these common designs is that the windmills do not offer a convenient structure from which to hang accessories associated with decorative windmill.

While there are many decorative windmills well known in the art, considerable room for improvement remains.

SUMMARY OF THE INVENTION

There is a need for a safer and more convenient windmill system.

Therefore, it is an object of the present invention to provide a safer and more convenient windmill system, having features allowing the user to easily utilize the system.

This object is achieved by providing a safer and more convenient windmill which allows the user to easily implement and utilize the system.

The present invention provides significant advantages, including: (1) allowing visual inspection of the windmill when the windmill is located in a poorly illuminated space thereby reducing the risk of physical injury related to using the windmill, such as stumbling due to poor illumination; (2) providing electrical power to electrical devices associated with windmill use or the decoration of a windmill; and (3) providing a convenient structure from which windmill accessories may be hung.

Further objects and advantages of this invention will become apparent from a consideration of the drawings and ensuing description.

BRIEF DESCRIPTION OF THE DRAWINGS

For a more complete understanding of the present invention, including its features and advantages, reference is now made to the detailed description of the invention taken in conjunction with the accompanying drawings in which like numerals identify like parts, and in which.

DETAILED DESCRIPTION OF THE PREFERRED EMBODIMENT

Figure 1:
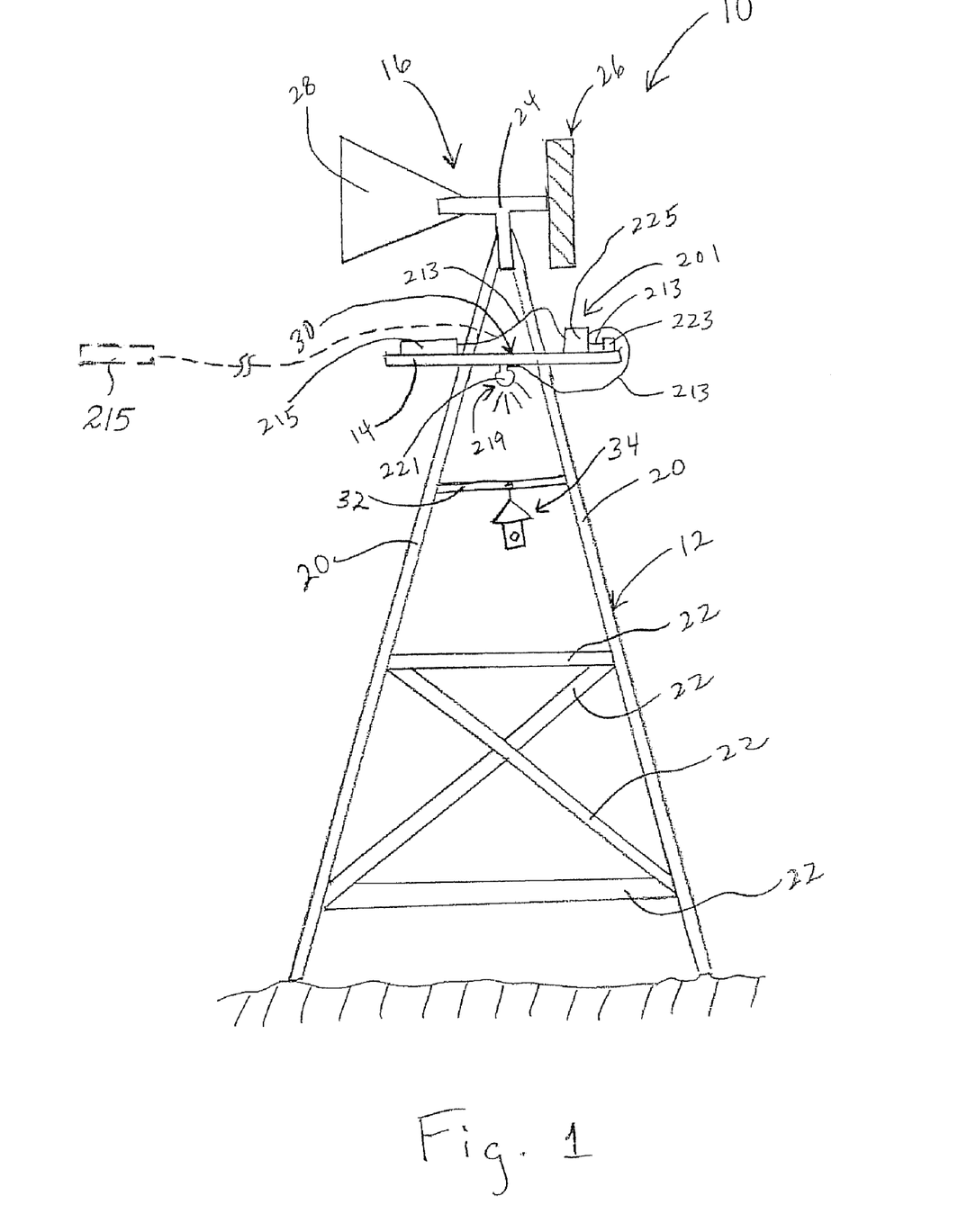
FIG. 1 is a front view of a windmill system according to the present invention.

Referring now to FIG. 1 in the drawings, the preferred embodiment of a windmill system 10 according to the present invention is illustrated. Windmill system 10 preferably comprises a frame 12, a platform 14, a wind assembly 16, and a solar energy system 201. Frame 12 preferably comprises a plurality of legs 20 and a plurality of cross members 22. Wind assembly 16 preferably comprises a swivel bracket 24, a blade assembly 26, and a vane 28.

Legs 20 and cross members 22 are preferably connected to substantially form a four sided standing structure. It should be appreciated that alternate embodiments of frame 12 may have more or fewer than four sides. Legs 20 substantially converge toward each other at the top end of legs 20. Platform 14 is connected to and carried by frame 12. Platform 14 is preferably a thin rectangular plate-like structure with a hole for accommodating the nearly converged ends of legs 20 therethrough.

Wind assembly 16 is preferably attached to the top end of frame 12. Swivel bracket 24 is substantially "T" shaped and is rotatably attached to legs 20 where legs substantially converge. Blade assembly 26 is rotatably attached to one end of swivel bracket 24 while vane 28 is rigidly attached to the opposing end of swivel bracket 24.

Frame 12 and platform 14 are preferably constructed of metal but may alternately be constructed of plastic, wood, or any other suitable material. Platform 14 preferably is attached to frame 12 such that platform 14 presents a top surface 30, a substantially level surface suitable for resting objects thereon.

Bracket 32 is preferably connected between two diagonally opposed legs 20. Bracket 30 is preferably adapted to carry associated hanging accessory 34. Hanging accessory 34 is preferably a bird house, but may alternatively be any other appropriate decorative or functional hanging item. Further, bracket 32 is preferably capable of carrying several hanging accessories 34 at various locations along the length of bracket 32. Bracket 32 is preferably disposed beneath platform 14.

Figure 2:
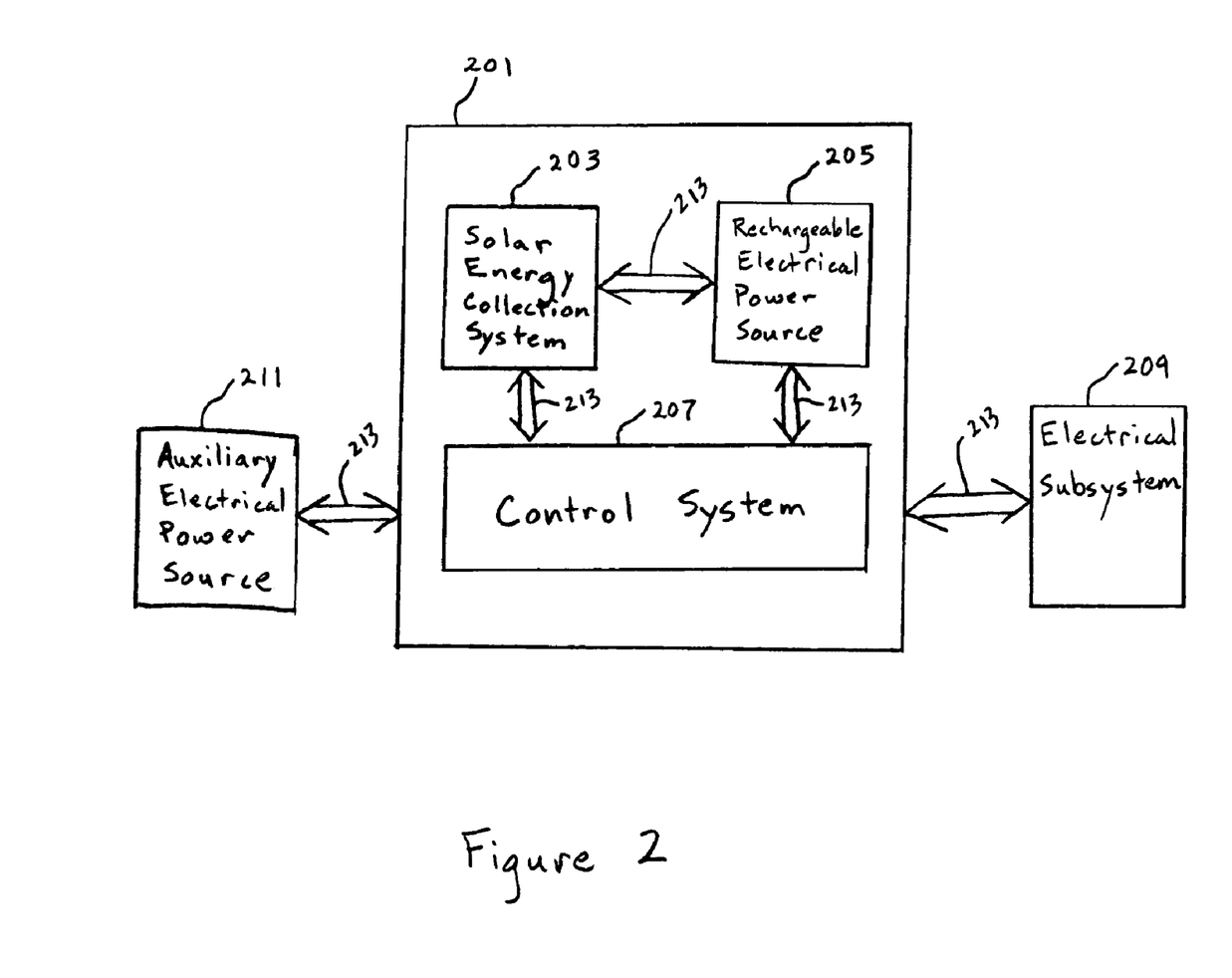
FIG. 2 is a high level schematic view of the solar energy system of the windmill system of FIG. 1.

Now referring to FIG. 2, the preferred embodiment of solar energy system 201 according to the present invention is illustrated. Solar energy system 201 preferably comprises a solar energy collection system 203, a rechargeable electrical power source 205, and a control system 207. Solar energy system 201 is preferably conductively coupled to an electrical subsystem 209. Solar energy system 201 may optionally be conductively coupled to an auxiliary electrical power source 211. Conductive coupling is preferably achieved through the use of electrical conductors 213 such as insulated copper wires, circuit boards, or other suitable devices or means for conductively coupling electrical components.

Solar energy collection system 203 preferably comprises a solar collector 215 (see FIG. 1) and other necessary circuitry for receiving and collecting solar energy and converting the solar energy into electrical energy. Solar energy collection system 203 is preferably conductively coupled to both rechargeable electrical power source 205 and control system 207 with electrical conductors 213. Rechargeable electrical power source 205 preferably comprises a rechargeable battery for storing electrical energy; however, rechargeable electrical power source 205 may alternatively comprise any rechargeable electrical power storage device, such as a capacitor, battery pack, any other suitable device for storing electrical energy, or combination thereof. Rechargeable electrical power source 205 is preferably conductively coupled to solar energy collection system 203 and control system 207 with electrical conductors 213.

The purpose of solar energy system 201 is preferably to convert solar energy into electrical energy and to supply that electrical energy to one or more electrical subsystems 209. In operation, solar energy collection system 203 preferably converts solar energy into electrical energy. Solar energy collection system 203 preferably delivers electrical energy to rechargeable electrical power source 205 to provide a trickle charge to rechargeable electrical power source 205. However, when rechargeable electrical power source 205 is fully charged, solar energy collection system 203 preferably delivers electrical energy to control system 207 where the electrical energy is preferably diverted for uses other than charging rechargeable electrical power source 205. For example, the electrical energy could be used to directly power electrical subsystem 209 rather than electrical subsystem 209 consuming power from rechargeable electrical power source 205.

Auxiliary electrical power source 211 preferably comprises an alternating current power source such as power from a conventional AC outlet; however, auxiliary electrical power source 211 may alternatively comprise a direct current power source such as a non-rechargeable battery, one or more fuel cells, a renewable energy source such as a wind powered generator, a rechargeable battery pack (in which the battery pack is removed, recharged remotely, and thereafter replaced back into auxiliary electrical power source 211), or any other electrical power source suitable for providing solar energy system 201 with additional electrical energy. Of course, the foregoing configuration allows for the interchanging, or swapping, of battery packs. More specifically, wind assembly 16 may be configured to produce and deliver electrical energy as wind forces blade assembly 26 to rotate according to known methods.

Alternative embodiments of solar energy system 201 may not include the solar energy collection system 203. Instead, solar energy system 201 may comprise a circuit for powering electrical subsystem 209 operable only by electrical energy supplied by auxiliary electrical power source 211.

Control system 207 preferably comprises circuitry, microprocessors, memory devices, sensors, switches, and other electronic components necessary to: partially or fully direct electrical energy from solar energy collection system 203 to rechargeable electrical power source 205, fully or partially direct electrical energy from solar energy collection system 203 to electrical subsystem 209, allow a user to manually switch solar energy system 201 on and off, receive input to alter or control the performance of the recharging of rechargeable electrical power source 205 and/or the supply of electrical energy to electrical subsystems 209, control the performance of electrical subsystems 209, fully or partially charge rechargeable electrical power source 205 with electrical energy supplied by auxiliary electrical power source 211, and fully or partially power electrical subsystem 209 with electrical energy from auxiliary power source 211.

It should be appreciated that while solar energy system 201 comprises control system 207 in this preferred embodiment, simpler and less sophisticated embodiments of solar energy system 201 are possible. For example, solar energy system 201 may not comprise control system 207 but merely comprise solar energy collection system 203 and rechargeable electrical power source 205 conductively coupled to each other with electrical conductors 213.

As illustrated in FIG. 1, electrical subsystem 209 is preferably a lighting subsystem 219 for providing illumination. Lighting subsystem 219 preferably comprises lighting elements 221 conductively coupled to solar energy system 201. Lighting elements 221 are preferably light emitting diodes (LEDs), but may be organic light emitting diodes, incandescent bulbs, cold cathode ray tubes, fluorescent lights, or any other suitable electrical lighting apparatus, or combination thereof. It should be appreciated that the electrical subsystem 209 of alternate embodiments of the present invention may be a water pumping subsystem, sound subsystem, video subsystem, microphone subsystem, receiving and transmitting subsystem, motion actuating subsystem, cooling subsystem, heating subsystem, raising and lowering subsystem, water agitation subsystem, electrical motor subsystem, any other electrically powered subsystem, or combination thereof.

A translucent shield, a lens, reflector, light fixture, or a combination of these may optionally be attached to or operably associated with lighting subsystem 219 to enhance or alter the illumination provided by lighting elements 221. The optional shields, lenses, reflectors, and fixtures may also be configured to prevent water, dirt, or other particulate matter from interfering with the operation of lighting elements 219. Further, it should be appreciated that the optional shields, lenses, reflectors, and fixtures may be incorporated into any embodiment of the present invention.

It should be appreciated that lighting subsystem 219 and control system 207 may include selected components, circuitry, and microprocessor control chips to produce a variety of optional features. For example, optional features may include: manual lighting intensity controls, blinking lights, fading lights, changing the light color, motion activated lighting, sound activated lighting, a wide variety of lighting sequence or motion effects, and any other appropriate lighting effects or interactive means for controlling lighting effects. Of course, any components, circuitry, microprocessor control chips, or other means of controlling or altering the functionality of electrical subsystem 209 would be conductively coupled to solar energy system 201, electrical subsystem 209, and/or auxiliary electrical power source 211. Further, where electrical subsystem 209 is not a lighting subsystem 219, it should be appreciated that similar controls, programming capabilities, interactive input devices, and other electrical subsystem 209 performance controls or alteration means may be incorporated into the electrical subsystem 209 and/or the associated control system 207.

A photo resistor, or photo cell 223 (see FIG. 1), is preferably incorporated into the preferred embodiment of control system 207. Photo cell 223 detects the presence of light and controls whether lighting elements 221 provide illumination, by switching lighting elements 221 on or off, or by regulating the intensity of light provided by lighting elements 221. For example, when photo cell 223 detects a substantial amount of light, lighting elements 221 are switched off and provide no illumination. However, when photo cell 223 detects a low level of light, lighting elements 221 are switched on and provide illumination. Alternatively, photo cell 223 may be used to dim or brighten the output of lighting elements 221. In addition, one or more on-off switches or buttons may be incorporated into control system 207 to facilitate the operation of solar energy system 201, or to vary the operation and control of solar energy system 201, auxiliary electrical power source 211, or electrical subsystem 209. It will be appreciated that the operation of solar energy system 201, auxiliary electrical power source 211, and electrical subsystem 209 may be controlled remotely by infrared light, radio wave, or other types of transmitters and receivers.

It should be appreciated that solar energy system 201 may further comprise or be conductively coupled to a connection port for conveniently interfacing solar energy system 201 with other components, systems, subsystems, or any other suitable devices. The connection port is preferably conductively coupled with control system 207; however, connection port may alternatively be conductively coupled to any other component of solar energy system 201, auxiliary electrical power source 211, or electrical subsystem 209. More specifically, connection ports may be adapted to interface with electrical devices electrical devices having power plugs compatible with the connection port. Connection ports would be a great convenience because electrical devices such as lights, fans, radios, or other suitable electrical devices could be supplied power or controlled by solar energy system when connected to the connection port.

Components of solar energy system 201, auxiliary electrical power source 211, and electrical subsystem 209 may be located substantially near each other. For example, in the preferred embodiment, with the exceptions of solar collectors 215, photo cell 223, and lighting elements 221, much of the circuitry of solar energy system 201, auxiliary electrical power source 211, and electrical subsystem 209 is preferably substantially housed within an enclosure 225 (see FIG. 1). It should be appreciated that the components of solar energy system 201, auxiliary electrical power source 211, and electrical subsystem 209 are preferably substantially protected such that water, dirt, and other matter is prevented from interfering with the operation of solar energy system 201, auxiliary electrical power source 211, and electrical subsystem 209. It should also be appreciated that in alternative embodiments, components of solar energy system 201, auxiliary electrical power source 211, and electrical subsystem 209 may not be housed in enclosure 225 and may be located substantial distances from each other while remaining conductively coupled. For example, an alternative embodiment of the present invention may be configured such that solar collector 215 is located on a home rooftop and is conductively coupled to rechargeable electrical power source 205, other components, systems, and/or subsystems which are located a significant distance away from solar collector 215, such as near the ground level of the home.

It should be appreciated that enclosure 225 may alternatively be adapted to carry all or substantially all of the components of solar energy system 201, electrical subsystem 209, and auxiliary electrical power source 211. In alternative embodiment of the present invention, enclosure 225 may be shaped and adapted for easy connection to and disconnection from the structure supporting enclosure 225. For example, an embodiment of enclosure 225 may allow enclosure 225 to be removably attached to the structure supporting enclosure 225, subsequently detached from the structure, and later removably attached to a different supporting structure. Alternatively, enclosure 225 may be integrally or sealably attached to a supporting structure. For example, enclosure 225 may be attached such that it passes through a hole in a supporting structure and forms a watertight seal with that hole. It should be appreciated that in alternative embodiments where the enclosure carries the entire solar energy system and/or other circuitry or systems, the enclosure may be inset, inlaid, or disposed in a recessed space of the supporting structure. For example, a leg may have a space cut out for fully or partially receiving the enclosure whereby lighting elements may illuminate windmill system from a recessed area of the leg, the wind assembly elements, and/or the platform. The enclosure may be similarly situated in other frame elements, the wind assembly elements, and/or the platform. Further, enclosure 225 may alternatively be attached to different types of structures or embodiments of the present invention suitable for supporting or carrying enclosure 225.

Components of solar energy system 201, auxiliary electrical power source 211, and electrical subsystem 209 may located and/or operably associated with various locations on each embodiment of windmill system, including internally within the components of the frame, platform, and wind assembly. Additionally, components of solar energy system 201, auxiliary electrical power source 211, and electrical subsystem 209 systems may be located remote from and even significantly distant from each windmill structure. Enclosure 225 is preferably attached to top surface 30 of platform 14; however, it should be appreciated that in some embodiments of the present invention, one or more components of solar energy system 201 may be located remote from top surface.

Solar collector 215 may be located at any suitable location on or about windmill system 10 or remote from windmill system 10; however, it is preferred that solar collector 215 be optimally exposed to solar light. Solar collector 215 is preferably attached to top surface 30 of platform 14, but may alternatively be located remote from top surface 30 as shown with broken lines in FIG. 1. For those applications in which windmill system 10 is primarily a decorative piece displayed indoors, it may be desirable to locate solar collector 215 at a location on the windmill structure that is near or faces a window, or at a location remote from the windmill structure where the remote location may have different ambient lighting conditions. For example, if the windmill structure is located indoors with low levels of light available for conversion to electrical energy by solar collector 215, solar collector 215 may be located outdoors to expose solar collector 215 to more light. It should be understood that sufficiently long electrical conductors 213 are incorporated to achieve remote placement of solar collectors 215 and other remotely located electrical components. For similar reasons, photo cell 223 is also preferably attached to top surface 30 of platform 14, but may alternately be located remote from top surface 30.

Lighting elements 221 are preferably attached to platform 14. Lighting elements 221 may also optionally be operably associated any of the structural members of windmill system 10. Specifically, lighting elements 221 may be attached to legs 20, cross members 22, and/or components of wind assembly 16. Lighting elements 221 preferably illuminate windmill system 10 and/or the space in and around windmill system 10. Specifically, lighting elements 221 are preferably connected to platform 14 and arranged to illuminate windmill system 10 in a manner such that the area below platform 14 is substantially illuminated. More specifically, lighting elements 221 are preferably connected to platform 14 and arranged to substantially illuminate hanging accessory 34. It should be appreciated that lighting elements 221 may alternatively be located remote from the windmill structure such that lighting elements 221 provide illuminations to spaces significantly remote from windmill system 10. For example, multiple lighting elements 221 may be located remote from the windmill structure so that the remotely located lighting elements 221 illuminate a path or walkway leading to the windmill structure.

It should be appreciated that components of windmill system 10 may alternatively be constructed of optically conductive material such as glass or a translucent plastic. Where components of windmill system 10 are constructed of an optically conductive material, lighting elements 221 may be located within the optically conductive components, thereby optionally creating a glowing illumination effect.

In alternative embodiments, multiple lighting elements may be located on or about windmill system. The multiple lighting elements may be arranged in a manner such that the lighting elements illuminate with strips of illumination. Further, alternate embodiments of windmill system may include more than one solar energy system to independently power multiple lighting elements.

Figure 3:
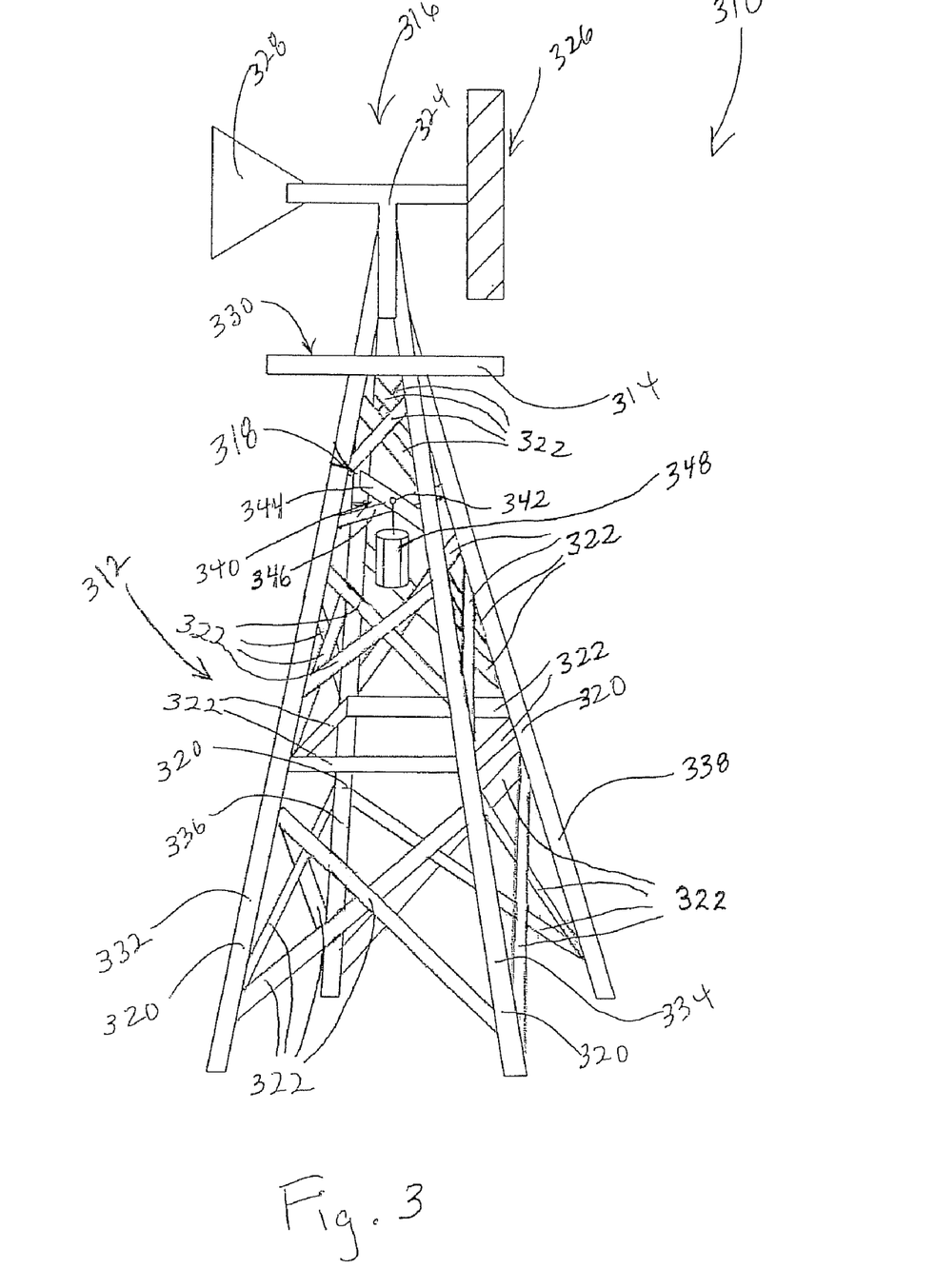
FIG. 3 is a perspective view of an alternate embodiment of a windmill system according to the present invention.

Referring now to FIG. 3 in the drawings, an alternate embodiment of a windmill system 310 according to the present invention is illustrated. Windmill system 310 preferably comprises a frame 312, a platform 314, a wind assembly 316, and an accessory hanging system 318. Frame 312 preferably comprises a plurality of legs 320 and a plurality of cross members 322. Wind assembly 316 preferably comprises a swivel bracket 324, a blade assembly 326, and a vane 328.

Legs 320 and cross members 322 are preferably connected to substantially form a four sided standing structure. The preferred embodiment comprises four legs 320: a front left leg 332, a front right leg 334, a rear left leg 336, and a rear right leg 338. Front left leg 332 and rear right leg 338 are not considered adjacent to each other. Similarly, front right leg 334 and rear left leg 336 are not considered adjacent to each other. Cross members 322 are preferably connected between adjacent legs.

It should be appreciated that alternate embodiments of frame 312 may have more or fewer than four sides. Legs 320 substantially converge toward each other at the top end of legs 320. Platform 314 is connected to and carried by frame 312. Platform 314 is preferably a thin rectangular plate-like structure with a hole for accommodating the nearly converged ends of legs 320 therethrough.

Wind assembly 316 is preferably attached to the top end of frame 312. Swivel bracket 324 is substantially "T" shaped and is rotatably attached to legs 320 where legs substantially converge. Blade assembly 326 is rotatably attached to one end of swivel bracket 324 while vane 328 is rigidly attached to the opposing end of swivel bracket 324.

Frame 312 is preferably constructed of metal but may alternately be constructed of plastic, wood, or any other suitable material. Platform 314 preferably is attached to frame 312 such that platform 314 presents a top surface 330, a substantially level surface suitable for resting objects thereon. Further, platform 314 is preferably translucent such that light may pass through platform 314 and shine onto solar collectors carried by a solar powered accessory as discussed below.

Accessory hanging system 318 preferably comprises a bracket 340 having at least one hole 342. Bracket 340 preferably comprises: a first strut 344 connected to rear left leg 336 and front right leg 334; and a second strut 346 connected to front left leg 332 and rear right leg 338. First strut 344 and second strut 346 are preferably rigidly connected to each other, forming bracket 340. In alternate embodiments, bracket 340 may be removably or adjustably connected to frame 312. For example, bracket 340 may be adjustably connected to frame 312 such that bracket can be lowered or raised relative to frame 312.

Hole 342 is preferably located on bracket 340 such that when an accessory 348 is hung from bracket 340 at hole 342, accessory 348 is suspended substantially centered between all four legs 320 as viewed from above. Alternate embodiments may be adapted to hang accessory 348 at positions not substantially centered between all four legs 320 as viewed from above. While the preferred embodiment of bracket 340 has hole 342 for providing a preferred feature from which to hang accessory 348, bracket 340 may alternately comprise notches, slots, adhesive elements, or an absence of features for providing a preferred feature of bracket 340 from which to hang accessory 348.

Accessory hanging system 318 is preferably constructed of metal but may alternately be constructed of plastic, wood, or any other suitable material. Accessory 348 is preferably a solar powered light comprising a solar energy system substantially similar to solar energy system 201; however, accessory 348 may alternatively be wind chimes, a bird house, an audio system, a thermometer, or any other appropriate decorative or functional item. While in the preferred embodiment only one accessory 348 is hung from bracket 340, alternative embodiments may include a plurality of accessories 348 hung from bracket 340.

The preferred embodiment of accessory 348 preferably substantially houses and/or carries a solar energy system and a lighting subsystem such as solar energy system 201 and lighting subsystem 219, respectively. Accessory 348 may optionally carry an auxiliary electrical power source substantially similar to auxiliary electrical power source 211.

Figure 4:
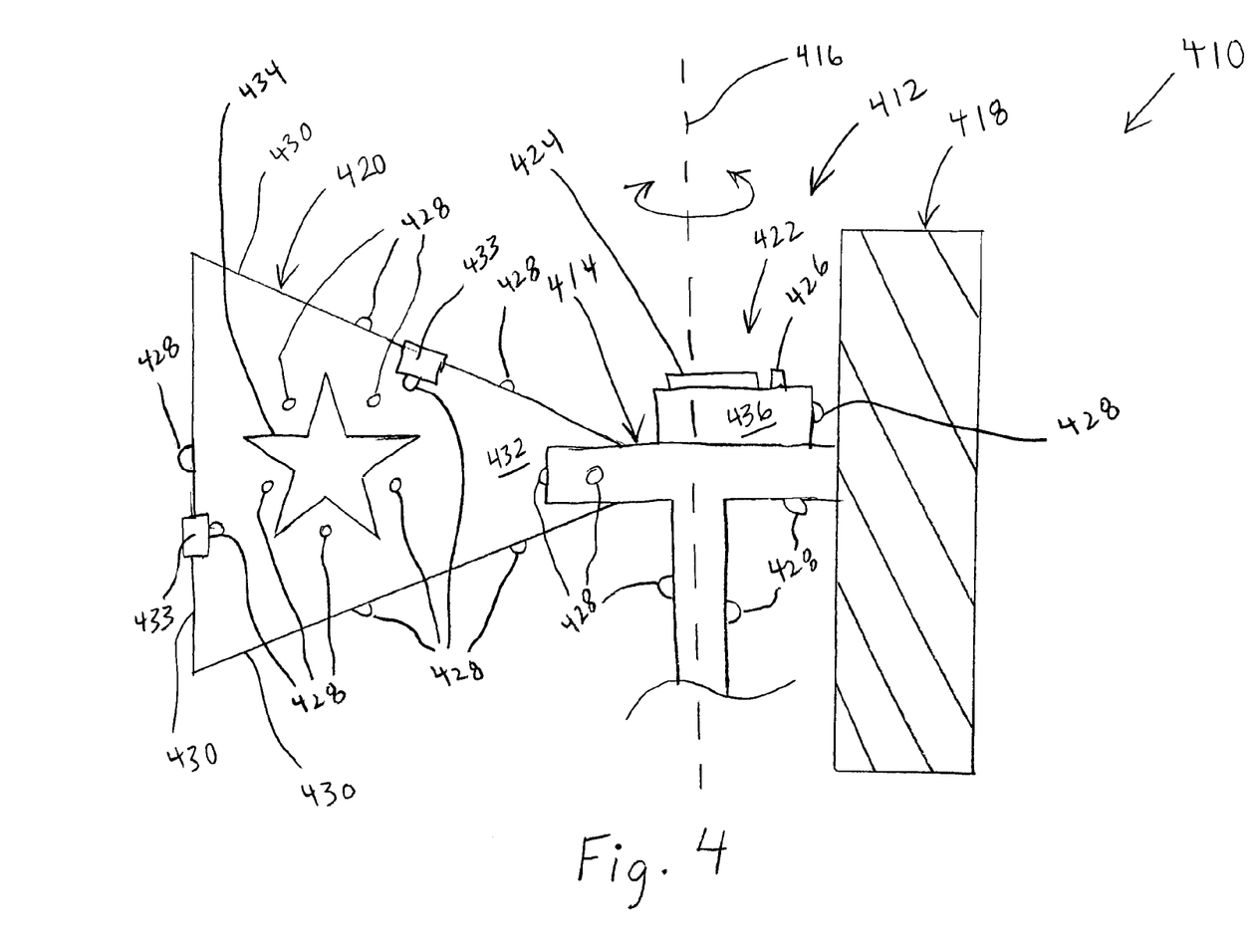
FIG. 4 is a side view of a portion of another alternate embodiment of a windmill system according to the present invention.

Referring now to FIG. 4 in the drawings, another alternate embodiment of a windmill system according to the present invention is illustrated. Windmill system 410 comprises a wind assembly 412 substantially similar to wind assembly 316. Swivel bracket 414 is substantially "T" shaped and is rotatably attached to windmill system legs (not shown) where the legs substantially converge. Swivel bracket 414 is operable to freely rotate about a substantially vertical axis 416 associated with swivel bracket 414. Blade assembly 418 is rotatably attached to one end of swivel bracket 414 while vane 420 is rigidly attached to the opposing end of swivel bracket 404. Swivel bracket 414 carries a solar energy system 422. Solar energy system 422 rotates about vertical axis 416 along with swivel bracket 414, allowing components of solar energy system 422 to remain generally fixed in spatial relation to wind assembly 412 as wind assembly rotates about axis 416. Solar energy system 422 comprises a solar cell 424, a photocell 426, and lighting elements 428. Lighting elements 428 are located at various about wind assembly 412, including: along edges 430 of vane 420, on faces 432 of vane 420, attached to vane 420 by overhanging brackets 433 to separate lighting elements 428 away from the substantially planar surface of faces 432 and direct light at an angle toward a decorative indicia 434 carried by vane 420 (causing a backlighting effect where indicia 434 is at least partially a cut out portion or window formed in vane 420), carried by swivel bracket 414 and/or located along any of the various surfaces of bracket 414, and carried by a solar energy system enclosure 436. Lighting elements 428 are particularly well placed to illuminate vane 420, indicia 434, blade assembly 418, and/or swivel bracket 414, even as wind assembly 412 rotates about axis 416.

Figure 5:
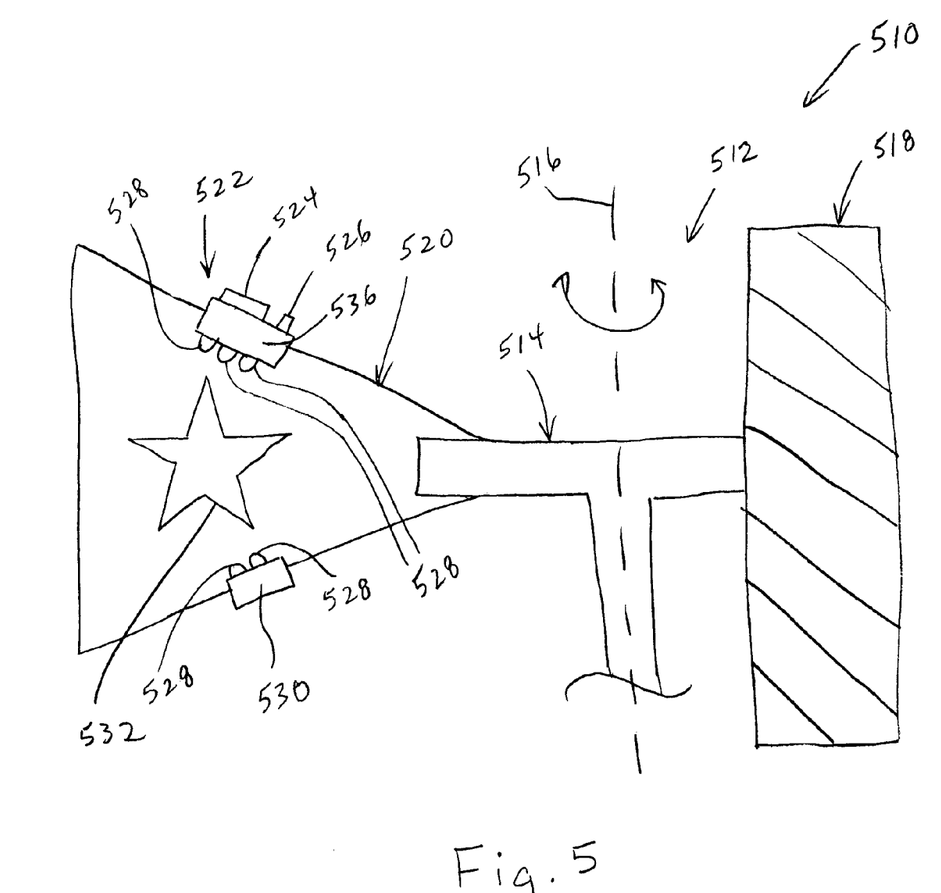
FIG. 5 is a side view of a portion of another alternate embodiment of a windmill system according to the present invention.

Referring now to FIG. 5 in the drawings, another alternate embodiment of a windmill system according to the present invention is illustrated. Windmill system 510 comprises a wind assembly 512 substantially similar to wind assembly 316. Swivel bracket 514 is substantially "T" shaped and is rotatably attached to windmill system legs (not shown) where the legs substantially converge. Swivel bracket 514 is operable to freely rotate about a substantially vertical axis 516 associated with swivel bracket 514. Blade assembly 518 is rotatably attached to one end of swivel bracket 514 while vane 520 is rigidly attached to the opposing end of swivel bracket 504. Vane 520 carries a solar energy system 522. Solar energy system 522 rotates about vertical axis 516 along with vane 520, allowing components of solar energy system 522 to remain generally fixed in spatial relation to wind assembly 512 as wind assembly rotates about axis 516. Solar energy system 522 comprises a solar cell 524, a photocell 526, and lighting elements 528. Lighting elements 528 are located at various about vane 520, including being attached to vane 520 by overhanging brackets 530 and aimed at an angle toward a decorative indicia 532 carried by vane 520 and being attached to a solar energy system enclosure 536 where enclosure 536 is attached to vane 520.

While this invention has been described with reference to an illustrative embodiment, this description is not intended to be construed in a limiting sense. Various modifications and other embodiments of the invention will be apparent to persons skilled in the art upon reference to the description.

We claim:

1. A decorative windmill, comprising:
   a frame having a plurality of upright members;
   a wind vane attached to the frame;
   a blade assembly attached to the vane;
   an electrical subsystem operably associated with the decorative windmill, the electrical subsystem comprising a lighting element supported by the frame; and
   a solar energy system conductively coupled to the electrical subsystem, the solar energy system comprising:
      a rechargeable electrical power source; and
      a solar energy collection system conductively coupled to the rechargeable electrical power source for recharging the rechargeable electrical power source.

2. The decorative windmill according to claim 1, wherein the electrical subsystem is a lighting system.

3. The decorative windmill according to claim 2, wherein the lighting system comprises at least one light emitting diode lighting element.

4. The decorative windmill according to claim 2, wherein the lighting system comprises at least one of the group including organic light emitting diode lighting elements, cold cathode ray tube lighting elements, incandescent bulb lighting elements, and fluorescent bulb lighting elements.

5. The decorative windmill according to claim 1, wherein the rechargeable electrical power source is at least one rechargeable battery.

6. The decorative windmill according to claim 1, wherein the rechargeable electrical power source is at least one removable rechargeable battery pack.

7. The decorative windmill according to claim 1, wherein the rechargeable electrical power source is adapted to be recharged by a source of alternating current.

8. The decorative windmill according to claim 1, wherein the rechargeable electrical power source is adapted to be recharged by a fuel cell.

9. The decorative windmill according to claim 1, wherein the electrical subsystem is selected from the group consisting of sound subsystems, video subsystems, cooling subsystems, heating subsystems, water pumping subsystems, microphone subsystems, receiving and transmitting subsystems, motion actuating subsystems, water agitation subsystems, electrical motor subsystems, and combinations thereof.

10. The decorative windmill according to claim 1, wherein at least a portion of the solar energy system is located remote from the decorative windmill.

11. A decorative windmill, comprising:
    a frame having a plurality of upright members;
    a windmill system supported by the frame, the windmill system comprising:
       a wind vane attached to the frame;
       a blade assembly attached to the vane;
    a lighting system supported by the frame, the lighting system comprising at least one lighting element for illuminating at least a portion of the windmill system; and
    a solar energy system conductively coupled to the lighting system, the solar energy system comprising:
       a rechargeable electrical power source; and
       a solar energy collection system conductively coupled to the rechargeable electrical power source for recharging the rechargeable electrical power source.

12. The decorative windmill according to claim 11, wherein the windmill system is rotatably supported by the frame.

13. The decorative windmill according to claim 12, wherein the at least one lighting element of the lighting system is carried by the windmill system.

14. The decorative windmill according to claim 13, wherein the at least one lighting element is attached to the wind vane.

15. The decorative windmill according to claim 14, wherein the wind vane includes a decorative indicia, and wherein the at least one lighting element is arranged so as to be operable for illuminating at least a portion of the decorative indicia.

16. The decorative windmill according to claim 13, wherein the windmill system further comprises a swivel bracket for connecting the windmill system to the frame.

17. The decorative windmill according to claim 16, wherein the at least one lighting element is attached to the swivel bracket.

18. The decorative windmill according to claim 12, wherein the solar energy collection system is carried by the windmill system.

* * * * *